US006684681B1

(12) United States Patent
Zombo

(10) Patent No.: US 6,684,681 B1
(45) Date of Patent: Feb. 3, 2004

(54) MECHANICAL ULTRASONIC AND HIGH FREQUENCY SONIC DEVICE

(75) Inventor: Paul Zombo, Cocoa, FL (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 0 days.

(21) Appl. No.: 10/236,705

(22) Filed: Sep. 6, 2002

(51) Int. Cl.$^{7}$ ............................ G01M 7/00; G01H 1/00

(52) U.S. Cl. ....................... 73/12.11; 73/12.12; 73/662; 73/432.1

(58) Field of Search ............................ 73/12.01, 12.09, 73/12.12, 12.11, 662, 865.3, 865.6, 432.1, DIG. 1

(56) References Cited

U.S. PATENT DOCUMENTS

| | | | | | |
|---|---|---|---|---|---|
| 2,418,437 | A | * | 4/1947 | Vogt | 324/413 |
| 4,918,988 | A | * | 4/1990 | Ebihara et al. | 73/594 |
| 5,048,320 | A | * | 9/1991 | Mitsuhashi et al. | 73/12.09 |
| 5,426,388 | A | | 6/1995 | Flora et al. | |
| 5,511,424 | A | | 4/1996 | MacLauchlan et al. | |
| 5,714,689 | A | | 2/1998 | Latimer et al. | |
| 5,721,379 | A | | 2/1998 | Palmer et al. | |
| 5,777,229 | A | | 7/1998 | Geier et al. | |
| 6,038,925 | A | | 3/2000 | Ohtani et al. | |
| 6,079,273 | A | | 6/2000 | Latimer et al. | |
| 6,125,703 | A | | 10/2000 | MacLauchlan et al. | |
| 6,170,336 | B1 | | 1/2001 | Johnson et al. | |
| 6,236,049 | B1 | | 5/2001 | Thomas et al. | |
| 6,263,737 | B1 | * | 7/2001 | Schoess | 73/583 |
| 6,282,964 | B1 | | 9/2001 | Hancock et al. | |
| 6,311,558 | B1 | | 11/2001 | Clark et al. | |
| 6,338,765 | B1 | * | 1/2002 | Statnikov | 148/558 |
| 6,460,415 | B1 | * | 10/2002 | Berman | 73/662 |

FOREIGN PATENT DOCUMENTS

| | | | | |
|---|---|---|---|---|
| DE | 4116471 A1 | * | 11/1992 | G01M/7/00 |
| JP | 58214838 A | * | 12/1983 | G01N/3/30 |

* cited by examiner

*Primary Examiner*—Hezron Williams
*Assistant Examiner*—Rose M. Miller

(57) ABSTRACT

A mechanical ultrasonic device that includes a housing assembly, a mechanical vibration assembly disposed within the housing assembly, and having an impact member. The mechanical vibration assembly is structured to vibrate the impact member at a frequency between about 5 kHz to 40 kHz. The impact member may be brought into contact with a test object thereby causing the ultrasonic vibration, or high frequency sonic vibration, to be transmitted through the test object.

23 Claims, 2 Drawing Sheets

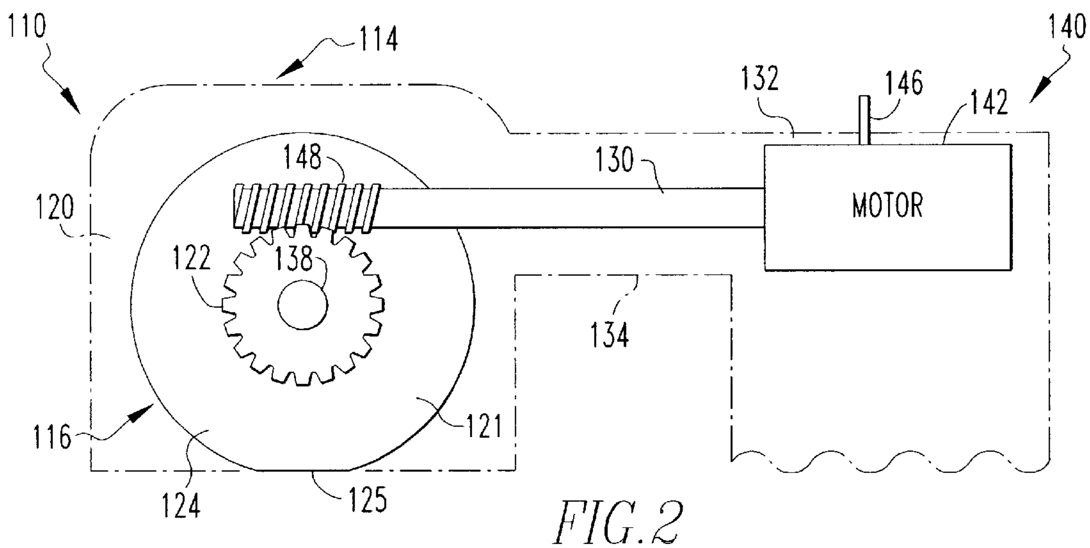
FIG.2
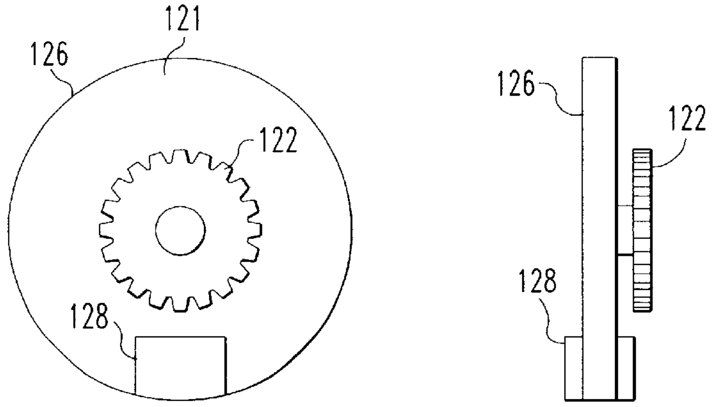
FIG.2A
FIG.2B
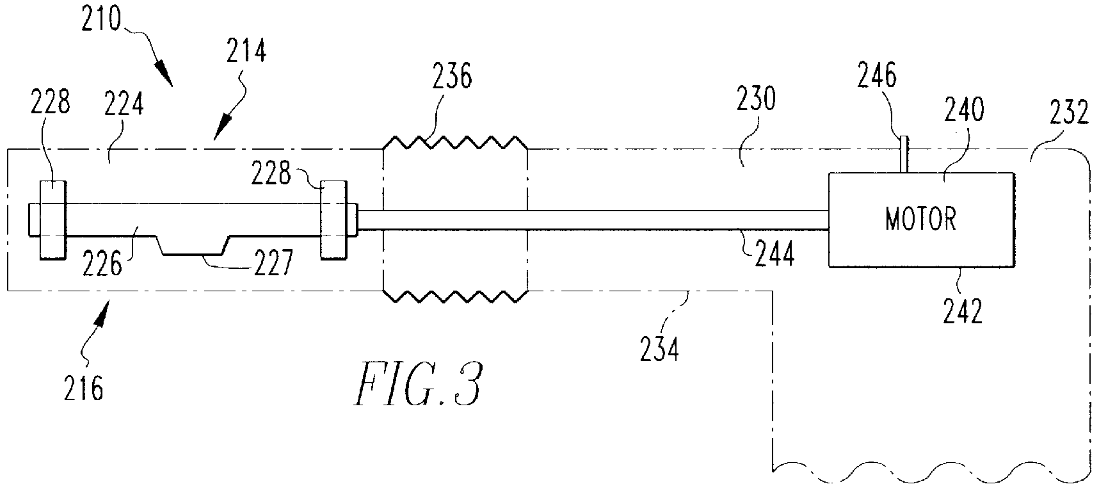
FIG.3

MECHANICAL ULTRASONIC AND HIGH FREQUENCY SONIC DEVICE

BACKGROUND OF THE INVENTION

1. Field of the Invention

This invention relates to a device for generating an ultrasonic and high frequency sonic vibration and, more specifically, to a mechanical device capable of producing an ultrasonic and high frequency sonic vibration.

2. Background Information

Ultrasonic and high frequency sonic sound waves, or vibrations, are typically created by a transducer having a piezoelectric crystal. When an alternating current is applied to the piezoelectric crystal, the piezoelectric crystal mechanically deforms. Using this effect, a high-frequency alternating electric current can be converted to an ultrasomic wave of the same frequency, typically over 20 kHz. The piezoelectric crystal is coupled to a mechanical wave guide that transmits the ultrasonic wave into another structure. The piezoelectric crystal transducer also converts mechanical deformations into a current. That is, vibrations transmitted into the piezoelectric crystal are converted into a current. This current can be analyzed and converted into data representing the information about the structure. As such, piezoelectric crystal transducers are typically structured to provide feedback from reflected ultrasonic vibrations.

Alternatively, an electromagnetic acoustic transducer (EMAT) may be used to create an ultrasonic wave in a conductive metal. An EMAT includes a magnet and a coil disposed perpendicularly to the magnetic field of the magnet. When a current is pulsed through the coil, an eddy current is induced in the ferrous material. The Lorentz force interaction between the eddy current and the magnetic field results in a dynamic stress in a direction perpendicular to both the magnetic field and the eddy current. This stress acts as a source for an ultrasonic wave which is passed through the structure. A second EMAT, typically disposed on the opposite side of the structure from the first EMAT, is structured to receive the ultrasonic vibration and convert the vibration to an electronic signal. Variations between the vibrations produced by the first EMAT and those received by the second EMAT, which are not attributable to the structure, may indicate an internal flaw in the structure.

An ultrasonic wave in a structure may, among other uses, be used as a non-destructive means to detect flaws within the structure. As noted above, typically piezoelectric crystal transducers pick up reflections of the wave created by an internal flaw or EMAT: transducers detect variations in the sent and received ultrasonic waves. Alternatively, as shown in U.S. Pat. No. 6,236,049, an ultrasonic vibration may be used as part of a thermal flaw detection system. That is, ultrasonic waves are transmitted into an object having flaws, such as cracks. It is hypothesized that the edges of the flaws vibrate against each other and create heat due to friction. The thermal difference between the flawed and non-flawed areas may then be viewed with a thermal imaging camera. Thus, when using the thermal imaging system, the components, on the prior art ultrasonic transducers that are structured to receive data, such as the reflected wave, are not used.

Each of these means for generating an ultrasonic vibration has a disadvantage. A piezoelectric crystal has a very narrow frequency range and must have specific dimensions in order to generate a specific frequency. Additionally, the piezoelectric crystal had a limited temperature range to about 200–300° F. The piezoelectric crystal dimensions are relatively large and, if the test object is small or has an uneven surface, the size of the piezoelectric crystal transducer may make it difficult to bring the piezoelectric crystal transducer into contact with the test object. The EMAT device, on the other hand, may only be operated with a conductive material that is capable of transmitting the eddy current and, as such, may not be used on devices such as ceramics and plastics.

There is, therefore, a need for a device capable of creating ultrasonic frequencies in a broad range.

There is a further need for a device capable of creating ultrasonic broad range frequencies that may be coupled to more than conductive materials.

There is a further need for a device capable of creating ultrasonic frequencies that is not structured to receive an ultrasonic signal so that the device may be optimized for generation of sound only manufactured at a reduced cost.

SUMMARY OF THE INVENTION

These needs, and others, are met by the present invention which provides a mechanical ultrasonic device structured to create an vibration within a range of about 5 kHz to 40 kHz. The device includes a mechanical vibration assembly and a impact member. The mechanical vibration assembly does not include a piezoelectric crystal or EMAT transducer. The mechanical vibration assembly may incorporate elements such as an AC solenoid or an electric motor coupled to a high speed eccentric cam or an eccentric shaft.

For example, in a first embodiment a solenoid having a low inertial core assembly and a coil coupled to a AC power source. Fluctuations in the magnetic field created by passing the AC current through the coil cause the core assembly to vibrate. In addition to having a low mass, the core acts as the impact member and must have a high strength in order to sustain the stress of high acceleration and impact loads. One arrangement includes a core assembly having a rigid outer jacket and a low mass ferromagnetic inner core.

A second embodiment includes a motor and an off-center disk. The motor is coupled to the off-center disk and structured to rotate the off-center disk within a range of about 5 kHz to 40 kHz. The off-center disk, which may be either a cam or a weighted flywheel, is disposed within an impact housing which acts as the impact member.

A third embodiment also includes a motor which is coupled to an eccentric shaft. That is, a cylindrical shaft having a one or more bulges extending through a discreet arc. The shaft is disposed within a hollow impact head assembly. When the motor is activated, the eccentric shaft causes the impact head assembly to vibrate.

The disclosed mechanical ultrasonic device is not structured to receive an ultrasonic signal. As such, compared to the prior art devices which are structured to receive feedback, the mechanical ultrasonic device is typically less expensive to manufacture. The mechanical ultrasonic device is intended for use with a thermal imaging system. That is, the impact member is structured to contact a test object and transmit the ultrasonic vibration through the test object.

BRIEF DESCRIPTION OF THE DRAWINGS

A full understanding of the invention can be gained from the following description of the preferred embodiments when read in conjunction with the accompanying drawings in which:

FIG. 2 is a cross-sectional view of an embodiment of the mechanical ultrasonic device having an off-center disk which is eccentric cam. FIG. 2A is a side view of an alternate off-center disk which is a weighted flywheel. FIG. 2B is a weighted flywheel shown in FIG. 2A.

FIG. 3 is a cross-sectional view of an embodiment of the mechanical ultrasonic device having an eccentric cylindrical shaft.

DESCRIPTION OF THE PREFERRED EMBODIMENTS

Figure 1:
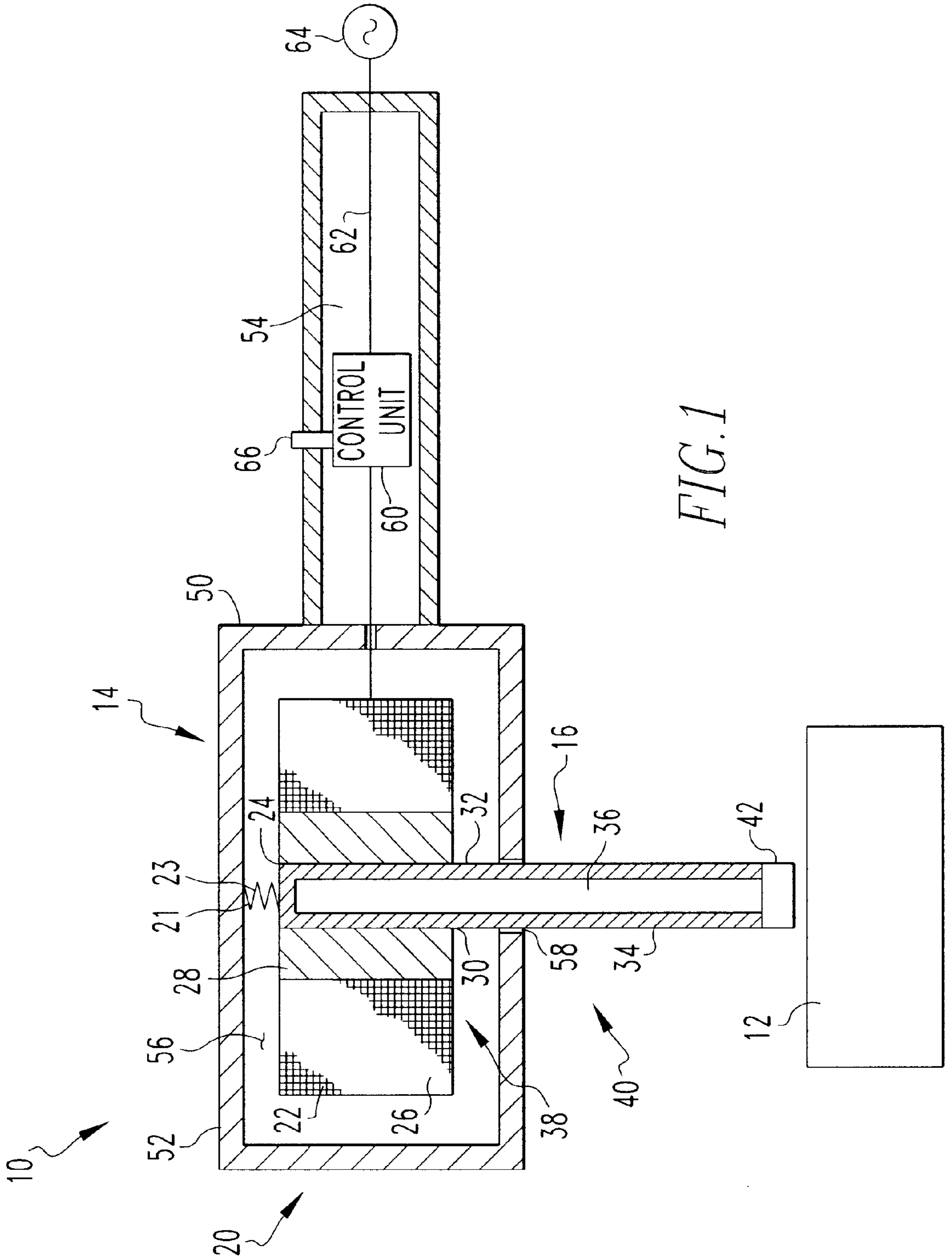
FIG. 1 is a cross-sectional view of an embodiment of the mechanical ultrasonic device having a solenoid.

As shown in FIGS. 1, 2 and 3, a mechanical ultrasonic device 10, 110, 210 is structured to vibrate at a frequency between about 5 kHz to 40 kHz. The mechanical ultrasonic device 10, 110, 210 includes a housing assembly 50, 130, 230, and a mechanical vibration assembly 14, 114, 214 having an impact member 16, 116, 216. The mechanical vibration assembly 14, 114, 214 is structured to vibrate the impact member 16, 116, 216 at a frequency between about 5 kHz to 40 kHz. Preferably, the mechanical vibration assembly 14, 114, 214 is further structured to have a means for selecting the frequency of the vibration. The impact member 16, 116, 216 is structured to contact a test object 12 so that an ultrasonic vibration is transmitted from the mechanical ultrasonic device 10, 110, 210 into the test object 12, as described below. Unlike a piezoelectric crystal or EMAT transducer, each mechanical ultrasonic device 10,1110, 210 utilizes a plurality of movable components, described below, to create the ultrasonic vibration. The mechanical ultrasonic device 10, 110, 210 is structured to allow frequency sweeping, pulsing multiple frequencies, and multiplexing. Additionally, The mechanical ultrasonic device 10, 110, 210 is structured to produce frequencies having various waveforms, such as, but not limited to, square waveforms and spiked waveforms.

In a first embodiment, shown in FIG. 1, the mechanical ultrasonic device 10 includes a housing assembly 50 and a mechanical vibration assembly 14 which is a solenoid assembly 20. The solenoid assembly 20 is disposed within the housing assembly 50. The solenoid assembly 20 includes a coil 22 and a core assembly 24. In this embodiment, the core assembly 24 is the impact member 16. As is well known, the coil 22 includes a conductive wire 26 which is wrapped multiple times about a hollow cylinder 28, thereby creating an electromagnet. The core assembly 24 is cylindrical and sized to fit within the hollow cylinder 28 and is structured to move between a first position and a second position. In the first position, a larger portion of the core assembly 24 is disposed outside the coil 22 than in the second position. In the second position, the core assembly 24 is drawn slightly into the coil 22 relative to the first position. The hollow cylinder 28 has an inner surface 30 which is preferably coated with a low friction coating 32 such as oil, Teflon, graphite, or a lubricant.

The core assembly 24 preferably is a low mass/high strength assembly. For example, the core assembly 24 preferably has a mass of less than about ten grams. The core assembly 24 and may include an outer jacket 34 and an inner core 36. The outer jacket 34 is, preferably, made from a high strength material such as steel or teol steel. The inner core 36 is made from a low mass ferromagnetic material such as ferrite or a ferro-fluid. The inner core 36 may further include a light weight filler material. For lower frequency applications, that is, around 5 kHz, the core assembly 24 may not have the inner core 36 and instead be a solid material such as steel. The core assembly 24 further has an upper portion 38 and a lower portion 40. The upper portion 38 is disposed within the hollow cylinder 28. The lower portion 40 extends beyond the housing assembly 50 as described below. The lower portion 40 may include a hammer tip 42 which is structured to impact a test object 12. The distance the hammer tip 42 moves is preferably about 100 um. The solenoid assembly 20 may further include a core assembly return device 21, such as a spring 23, which is structured to return the core assembly 24 to the first position.

The housing assembly 50 includes a solenoid housing 52 and a handle 54. The solenoid housing 52 defines a cavity 56 having an opening 58. The solenoid assembly 20 is disposed within the solenoid housing cavity 56. The core assembly lower portion 40 extends through the opening 58. The handle 54 is structured to be grasped by a user. The handle 54 encloses a control unit 60 and a conductor, such as a wire 62. The wire 62 is coupled to a source of current 64. Preferably, the current is an alternating current. The control unit 60 may include components such as a frequency generator and amplifier so that the control unit 60 is structured to vary the frequency of the current to assist in creating sweeping, pulsing multiple frequency, and multiplexing waves, as well as frequencies having various waveforms. If the current is a direct current, the control unit 60 is further adapted to provide an alternating output current. The control unit 60 further includes a control knob 66 by which the user may adjust the frequency of the current.

In operation, the coil 22 is energized by the alternating current from the control unit 60. During the positive half cycle of the current, the magnetic field created by the coil 22 moves the core assembly 24 to the first position. During the negative half cycle of the current, the magnetic field created by the coil 22 moves the core assembly 24 to the second position. Thus, the frequency of the alternating current controls the frequency of occialtions of the core assembly 24. By supplying a current having a frequency between 5 kHz to 40 kHz, the core assembly 24 may be used to create an ultrasonic vibration in a test object 12. That is, the core assembly 24, and preferably the hammer tip 42, is brought into contact with the test object 12. As the core assembly 24 moves between the first and second positions, an ultrasonic vibration, or high frequency sonic vibration, is transmitted into the test object 12.

As shown in FIG. 2, a second embodiment of the mechanical ultrasonic device 110 has a housing assembly 130, and a mechanical vibration assembly 14 which includes an impact housing 120, an off-center disk 121 and a motor assembly 140. In this embodiment, the impact housing 120 is the impact member 116. The housing assembly 130 includes a handle portion 132, an elongated neck portion 134, and an impact housing 120. The handle portion 132 is sized to enclose the motor assembly 140. The neck portion 134 is elongated so that the off-center disk 121 is spaced from the handle portion 132. The handle portion 132 includes an axle 138 upon which the off-center disk 121 is disposed. The motor assembly 140 is, preferably, an electric motor 142 having a drive shaft 144. The motor 142 is structured to rotates the drive shaft 144. The speed of the motor 142 may be adjusted by a control knob 146. Additionally, the motor 142 may include a control device structured to control the rotation of the drive shaft 144 to assist in creating sweeping, pulsing multiple frequency, and multiplexing waves, as well as frequencies having various waveforms. The drive shaft 144 terminates in a threaded end 148. The drive shaft 144 may have a low friction coating 129 such as oil, graphite, or Teflon. The off-center disk 121 includes a gear 122 that is structured to engage the threaded end 148 of the drive shaft 144. The off-center disk 121 is rotatably coupled to the impact housing 120. The motor 142 provides a sufficient rotational speed to the drive shaft 144 so that the off-center disk 121 rotates at a frequency between 5 kHz to 40 kHz.

The off-center disk 121 may be either a cam disk 124 as shown in FIG. 2, or a weighted flywheel 126 as shown in FIG. 2A. The cam disk 124 is generally circular except for one slightly flattened portion 125. The weighted flywheel 126 is generally circular and includes at least one off-center mass 128. The off-center mass 128 is located along a discrete arc and may be disposed at any location between the axis of the disk and the radial edge. There may be more than one off-center mass 128 and each off-center mass 128 may have a different size or shape. The variations in the size and shape of the off-center mass 128 change the shape of the wave created by the device 110 to assist in creating sweeping, pulsing multiple frequency, and multiplexing waves.

In operation, the second embodiment operates as follows. The motor assembly 140 causes the off-center disk 121 to rotate at a frequency between 5 kHz to 40 kHz. Because of either the flattened portion, when a cam disk 124 embodiment is used, or because of the off center mass 128 when the flywheel 126 embodiment is used, the off-center disk 121 wobbles, that is, moves unevenly about the axle 138 creating an alternating force, as the off-center disk 121 is rotated. The alternating force created by the off-center disk 121 causes the impact housing 120 to vibrate. The impact housing 120 is then brought into contact with the test object 12 and thereby imparts a high frequency sonic or ultrasonic vibration to the test object 12.

As shown in FIG. 3, a third embodiment of the mechanical ultrasonic device 210 has a housing assembly 230 and a mechanical vibration assembly 214 which includes an impact head assembly 220, and a motor assembly 240. In this embodiment, impact head assembly 220 is the impact member 216. The housing assembly 230 includes a handle portion 232, an elongated neck portion 234, and may have a flexible portion 236. The handle portion 232 is sized to enclose the motor assembly 240. The neck portion 234 is elongated so that the impact head assembly 220 is spaced from the handle portion 232. The motor assembly 240 is, preferably, an electric motor 242 having a drive shaft 244. The motor 242 is structured to rotate the drive shaft 244. The speed of the motor 242 may be adjusted by a control knob 246. Additionally, the motor 242 may include a control device structured to control the rotation of the drive shaft 244 to assist in creating sweeping, pulsing multiple frequency, and multiplexing waves, as well as frequencies having various waveforms. The motor 242 rotates the drive shaft 244 at a frequency between about 5 kHz to 40 kHz.

The impact head assembly 220 includes a housing 222 defining a cavity 224. Within the impact head housing cavity 224 is an eccentric shaft 226. The eccentric shaft 226 is generally cylindrical except for one or more medial bulges 227 extending across a discreet arc. That is, the ends of the eccentric shaft 226 are cylindrical but, between the ends, is a medial portion of the shaft 226 that includes one or more bulges 227. The one or more bulges 227 does not extend along the entire circumference of the cylinder. As such, the center of gravity of the medial portion of the shaft 226 is not along the axis of the shaft 226. Moreover, the one or more bulges 227 may be structured with different shapes and sizes to assist in creating sweeping, pulsing multiple frequency, and multiplexing waves. The shape and size of the one or more bulges 227 will determine the wave shape created by the device 210. The cylindrical end portions of the eccentric shaft 226 are rotatably coupled to the impact head housing 222 by brackets 228. The eccentric shaft 226 is further coupled to the drive shaft 244.

In operation, the third embodiment operates as follows. The user activates the motor 242 causing the drive shaft 244, and therefore the eccentric shaft 226, to rotate. Because of the off-center configuration of the eccentric shaft 226, the eccentric shaft 226 causes the impact head assembly 220 to vibrate. To increase the amplitude of the vibration, the elongated neck portion 234 may have a flexible portion 236 which allows the impact head assembly 220 to have a greater range of motion relative to the housing handle portion 232. As the impact head assembly 220 vibrates the user places the impact head housing 220 against a test object 12. The impact head assembly 220 bounces against, or applies alternating pressure against, the test object 12 creating an ultrasonic vibration, or high frequency sonic vibration, which is transmitted into the test object 12.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A mechanical high frequency sonic and ultrasonic device comprising:

a housing assembly;

a mechanical vibration assembly disposed within said housing and having an impact member; and wherein said mechanical vibration assembly is structured to vibrate said impact member at a frequency between about 5 kHz to 40 kHz.

2. The mechanical high frequency sonic and ultrasonic device of claim 1, wherein said mechanical vibration assembly does not include a piezoelectric crystal or EMAT transducer.

3. The mechanical high frequency sonic and ultrasonic device of claim 1, wherein said mechanical vibration assembly includes a means for selecting the frequency of the vibration.

4. The mechanical high frequency sonic and ultrasonic device of claim 1, wherein said impact member is structured to contact a test object and transmit an ultrasonic vibration into said test object.

5. The mechanical high frequency sonic and ultrasonic device of claim 1, wherein:

said mechanical vibration assembly is a solenoid assembly having a core assembly; and said impact member is said core assembly.

6. The mechanical high frequency sonic and ultrasonic device of claim 5, wherein said core assembly has mass of less than about 10 grams.

7. The mechanical high frequency sonic and ultrasonic device of claims 5, wherein said core assembly is made from steel.

8. The mechanical high frequency sonic and ultrasonic device of claim 5, wherein:

said solenoid assembly includes a coil and a control unit; and said control unit coupled to a source of current and structured to provide a variable frequency alternating current to said coil.

9. A mechanical high frequency sonic and ultrasonic device comprising:

a housing assembly;

a mechanical vibration assembly disposed within said housing and having an impact member;

wherein said mechanical vibration assembly is structured to vibrate said impact member at a frequency between about 5 kHz to 40 kHz; and wherein said mechanical vibration assembly is structured to allow frequency sweeping, pulsing multiple frequencies, and multiplexing.

10. A mechanical high frequency sonic and ultrasonic device comprising:

a housing assembly;

a mechanical vibration assembly disposed within said housing and having an impact member;

wherein said mechanical vibration assembly is structured to vibrate said impact member at a frequency between about 5 kHz to 40 kHz; and wherein said mechanical vibration assembly is structured to produce frequencies having various waveforms.

11. The mechanical high frequency sonic and ultrasonic device of claim 10, wherein said waveforms are selected from the group consisting of square waveforms and spiked waveforms.

12. A mechanical high frequency sonic and ultrasonic device comprising:

a housing assembly;

a mechanical vibration assembly disposed within said housing and having an impact member;

wherein said mechanical vibration assembly is structured to vibrate said impact member at a frequency between about 5 kHz to 40 kHz;

said mechanical vibration assembly is a solenoid assembly having a core assembly;

said impact member is said core assembly;

said core assembly has mass of less than about 10 grams; and said core assembly includes an outer jacket and an inner core.

13. The mechanical high frequency sonic and ultrasonic device of claim 12, wherein said inner core is made from material selected from the group consisting of ferrite or a ferro-fluid.

14. The mechanical high frequency sonic and ultrasonic device of claim 12, wherein said outer jacket is made from steel.

15. A mechanical high frequency sonic and ultrasonic device comprising:

a housing assembly;

a mechanical vibration assembly disposed within said housing and having an impact member;

wherein said mechanical vibration assembly is structured to vibrate said impact member at a frequency between about 5 kHz to 40 kHz; and said mechanical vibration assembly includes a motor, an off-center disk, and an impact housing;

said motor coupled to said off-center disk; said off-center disk is rotatably coupled to said impact housing; and said impact housing is said impact member.

16. The mechanical high frequency sonic and ultrasonic device of claim 15, wherein:

said motor is a variable speed motor having a drive shaft terminating in a gear;

said gear structured to engage said off-center disk; and said motor structured to rotate said drive shaft and thereby rotate said off-center disk.

17. The mechanical high frequency sonic and ultrasonic device of claim 16, wherein said drive shaft includes a lubricating coating.

18. The mechanical high frequency sonic and ultrasonic device of claim 16, wherein said off-center disk is a cam.

19. The mechanical high frequency sonic and ultrasonic device of claim 16, wherein said off-center disk is a weighted flywheel having at least one off-center mass.

20. A mechanical high frequency sonic and ultrasonic device comprising:

a housing assembly;

a mechanical vibration assembly disposed within said housing and having an impact member;

wherein said mechanical vibration assembly is structured to vibrate said impact member at a frequency between about 5 kHz to 40 kHz;

said mechanical vibration assembly is a motor coupled to an eccentric shaft and an impact head assembly; and said impact head assembly is said impact member.

21. The mechanical high frequency sonic and ultrasonic device of claim 20, wherein:

said impact head assembly includes a housing assembly defining a cavity and an eccentric shaft rotatably disposed in said cavity;

said motor is a variable speed motor having a drive shaft;

said drive shaft coupled to said eccentric shaft; and said motor structured to rotate said drive shaft and eccentric shaft, whereby said impact head assembly vibrates.

22. The mechanical high frequency sonic and ultrasonic device of claim 21, wherein said eccentric shaft is a cylindrical shaft having one more bulges.

23. The mechanical high frequency sonic and ultrasonic device of claim 21, wherein:

said housing assembly includes a handle portion and an elongated neck portion and a flexible portion; and said impact head assembly coupled to said housing assembly at said flexible portion.

* * * * *